US007564793B2

(12) United States Patent
    Baldwin et al.

(10) Patent No.: US 7,564,793 B2
(45) Date of Patent: Jul. 21, 2009

(54) IN-BAND CALL ASSOCIATION SIGNALING FOR A SINGLE NUMBER DESTINATION

(75) Inventors: Christopher David Baldwin, Princeton, NJ (US); Donald E. Gillespie, Boulder, CO (US); Albert D. Pessot, Boulder, CO (US); Robert V. Phillips, III, Matawan, NJ (US)

(73) Assignee: Avaya Inc., Basking Ridge, NJ (US)

( * ) Notice: Subject to any disclaimer, the term of this patent is extended or adjusted under 35 U.S.C. 154(b) by 653 days.

(21) Appl. No.: 11/107,659

(22) Filed: Apr. 14, 2005

(65) Prior Publication Data

US 2006/0146799 A1   Jul. 6, 2006

Related U.S. Application Data

(60) Provisional application No. 60/641,629, filed on Jan. 4, 2005.

(51) Int. Cl.
    *H04J 9/00*     (2006.01)
(52) U.S. Cl. ...................... 370/237; 340/2.23
(58) Field of Classification Search ............. 340/2.23; 370/237, 238, 249, 352, 354, 355, 370, 395.32, 370/401; 379/221.01, 273; 455/445; 709/239
    See application file for complete search history.

(56) References Cited

U.S. PATENT DOCUMENTS

| | | | |
|---|---|---|---|
| 5,206,903 | A | 4/1993 | Kohler et al. |
| 5,280,561 | A | 1/1994 | Satoh et al. |
| 5,828,747 | A | 10/1998 | Fisher et al. |
| 5,905,793 | A | 5/1999 | Flockhart et al. |

(Continued)

FOREIGN PATENT DOCUMENTS

EP        0805576 A2     11/1997

(Continued)

OTHER PUBLICATIONS

U.S. Appl. No. 11/231,203, filed Sep. 19, 2005, Baldwin.

(Continued)

*Primary Examiner*—Hassan Kizou
*Assistant Examiner*—Yong Zhou
(74) *Attorney, Agent, or Firm*—Sheridan Ross P.C.

(57) ABSTRACT

In one configuration, the present invention is directed to an enterprise network that includes geographically dislocated first and second network regions 202 and 206 communicating with one another through first and second networks 252 and 248 and respectively comprising first and second gateways 220 and 224 and first and second groupings of trunks. A common electronic address is associated with the second grouping of trunks. A media server 200 is positioned in the first network region 202 that includes an inter-gateway routing agent 260. The first network region transmits, as part of the establishment of a real-time or near real-time communication between first and second subscribers respectively in the first and second network regions, the common address to the second gateway 224. After the outgoing communication is answered by the second gateway 224, the first network region transmits in band to the second gateway 224 a user identifier associated with the second subscriber and/or a phantom user. The user identifier is used to establish the communication with the second subscriber.

43 Claims, 6 Drawing Sheets

U.S. PATENT DOCUMENTS

| | | | |
|---|---|---|---|
| 5,974,114 | A | 10/1999 | Blum et al. |
| 5,982,873 | A | 11/1999 | Flockhart et al. |
| 6,163,607 | A | 12/2000 | Bogart et al. |
| 6,173,053 | B1 | 1/2001 | Bogart et al. |
| 6,192,122 | B1 | 2/2001 | Flockhart et al. |
| 6,282,192 | B1 | 8/2001 | Murphy et al. |
| 6,292,463 | B1 | 9/2001 | Burns et al. |
| 6,314,114 | B1 | 11/2001 | Coyle et al. |
| 6,411,705 | B2 | 6/2002 | Oran et al. |
| 6,434,226 | B1 | 8/2002 | Takahashi |
| 6,504,922 | B1 | 1/2003 | Erb |
| 6,574,469 | B1 | 6/2003 | Xiang et al. |
| 6,665,375 | B1 | 12/2003 | Forlenza et al. |
| 6,671,262 | B1 | 12/2003 | Kung et al. |
| 6,721,712 | B1 | 4/2004 | Benyassine et al. |
| 6,731,734 | B1 | 5/2004 | Shaffer et al. |
| 6,738,343 | B1 | 5/2004 | Shaffer et al. |
| 6,801,612 | B2 | 10/2004 | Malcolm et al. |
| 6,925,076 | B1 | 8/2005 | Dalgic et al. |
| 6,937,873 | B2 | 8/2005 | Levy et al. |
| 6,950,874 | B2 | 9/2005 | Chang et al. |
| 6,968,382 | B2 | 11/2005 | McBrearty et al. |
| 6,973,506 | B2 | 12/2005 | Ishiyama et al. |
| 6,999,478 | B2 | 2/2006 | D'Angelo |
| 7,042,871 | B2 | 5/2006 | Gallant et al. |
| 7,145,900 | B2 | 12/2006 | Nix et al. |
| 7,161,897 | B1 | 1/2007 | Davies et al. |
| 7,215,643 | B2 * | 5/2007 | Mussman et al. ........... 370/237 |
| 7,227,927 | B1 | 6/2007 | Benedyk et al. |
| 7,243,142 | B2 | 7/2007 | Poirot et al. |
| 2003/0031137 | A1 | 2/2003 | Mecklin Tomas |
| 2003/0091024 | A1* | 5/2003 | Stumer ...................... 370/352 |
| 2004/0028199 | A1 | 2/2004 | Carlson |
| 2004/0101119 | A1 | 5/2004 | Malcolm et al. |
| 2004/0143665 | A1 | 7/2004 | Mace et al. |
| 2004/0252676 | A1 | 12/2004 | Bye |
| 2005/0068889 | A1 | 3/2005 | Chavez et al. |
| 2005/0281216 | A1 | 12/2005 | Varonen et al. |
| 2006/0034297 | A1 | 2/2006 | O'Neill |
| 2006/0067274 | A1 | 3/2006 | Gillespie et al. |
| 2006/0092919 | A1 | 5/2006 | Hallmark et al. |
| 2006/0146737 | A1 | 7/2006 | Sandgren et al. |
| 2006/0146799 | A1 | 7/2006 | Baldwin et al. |
| 2006/0146802 | A1 | 7/2006 | Baldwin |
| 2006/0146859 | A1 | 7/2006 | Baldwin et al. |
| 2006/0168326 | A1 | 7/2006 | Baldwin et al. |

FOREIGN PATENT DOCUMENTS

| | | |
|---|---|---|
| EP | 0 920 176 A2 | 6/1999 |
| EP | 0964563 | 12/1999 |
| EP | 1091550 | 4/2001 |
| EP | 1250023 A1 | 10/2002 |
| EP | 1677569 A1 | 7/2006 |
| EP | 1677570 A1 | 7/2006 |
| JP | 08-065340 | 3/1996 |
| JP | H8-320800 | 12/1996 |
| JP | H10-164240 | 6/1998 |
| JP | 10-224408 | 8/1998 |
| JP | H10-214240 | 8/1998 |
| JP | H11-331153 | 11/1999 |
| JP | 2000-174824 | 6/2000 |
| JP | 2000-174825 | 6/2000 |
| JP | 2001-156786 | 6/2001 |
| JP | 2001-196165 | 7/2001 |
| JP | 2002-522962 | 7/2002 |
| JP | 2002-237896 | 8/2002 |
| JP | 2002-247187 | 8/2002 |
| JP | 2002-305588 | 10/2002 |
| JP | 2003-101669 | 4/2003 |
| JP | 2003-514439 | 4/2003 |
| JP | 2003-244204 | 8/2003 |
| JP | 2004-186766 | 7/2004 |
| WO | WO 00/72536 | 11/2000 |
| WO | WO 00/72560 A1 | 11/2000 |
| WO | WO 01/65808 | 9/2001 |

OTHER PUBLICATIONS

"Separation of Bearer and Signaling for Avaya™ Communication Manager," Avaya, Issue 1 (May 2003), pp. 1-42.

Clark, William J.; "Multipoint Multimedia Conferencing"; IEEE Communications Magazine; May 1992; pp. 44-50.

European Search Report for counterpart application; No. 05258062.8; Sep. 5, 2006.

European Examination Report for EP counterpart application, Application No. 05258062.8, Jan. 26, 2007.

U.S. Appl. No. 11/080,763, filed Mar. 14, 2005, Coughlan et al.

M. Bozinovski et al., "Fault-tolerant SIP-based call control system," Electronics Letters, vol. 39, No. 2 (Jan. 23, 2003), pp. 254-256, XP006019695 ISSN: 0013-5194.

ITU-T Recommendation H.248, "Series H: Audiovisual and Multimedia Systems," International Telecommunication Union (Jun. 2000), pp. 1-121.

Kristol and Montulli, "HTTP State Management Mechanism," Oct. 2000, pp. 1-22, available at http://www.cse.ohio-state.edu/cgi-bin/rfc/rfc2965.html, printed Feb. 3, 2005.

Carroll Communications, Inc. Automatic Route Selection (ARS) Feature, at http://www.carrollcommunications.com/merlinmagix/AutomaticRouteSelection.html, 2 pages, Mar. 11, 2005.

KXTD System—ISDN—Basic and Primary Rate Interfaces, at http://www.thetelephoneexchange.co.uk/Teleweb_files/kxtd.html, 5 pages, May 23, 2001.

WestNet Learning—glossary for UDP, at http://glossary.westnet.com/term.php?termId=2213, 1 page, Feb. 9, 2003.

Declaration of Michael Gruen Under 37 CFR Section 1.98; 3 pages, Mar. 27, 2006.

Cisco Systems Overview—Cisco IOS Telephony Services: Survival Remote Site Telephony, "Now Cost-Effectively Extend Cisco CallManager IP Telephony and High Productivity Applications to Small Branch Office Sites" Copyright 2001, Cisco Systems, Inc., pp. 1-4, Aug. 2004.

Cisco Systems Solutions Guide—"Survivable Remote Site Telephony Cisco 2600/3600 Voice Technical Marketing" Copyright 1992-2001, Cisco Systems, Inc. , pp. 1-19, Jan. 21, 2002.

Cisco Systems IOS Release 12.2(8)T—Survivable Remote Site Telephony, pp. 1-74, Nov. 2002.

Cisco Solutions Guide—"Survivable Remote Site Telephony Cisco 2600/3600 Voice Technical Marketing" Copyright 1992-2001, Cisco Systems, Inc., http://www.cicso.com/warp/public/cc/pd/unco/srstl/tech/demha_sg.htm (21 pages).

Cisco Systems—Survivable Remote Site IP Telephony, Copyright 1992-2003, Cisco Systems, Inc., http://www.cisco.com/warp/public/cc/pd/unco/srstl, 1 page.

Cisco Systems White Paper—"Ensuring IP Telephony High Availability in the Branch Office, Now Cost-effectively Extend Cisco CallManager IP Telephony to Small Branch Office Sites Using Cisco Survivable Remote Site Telephony" Copyright 1992-2005, Cisco Systems, Inc., http://www.cisco.comlen/us/products/sw/voicesw/ps2169/products_white_paper09186a008 . . . (5 pages).

Cisco IP Telephony Solution Reference Network Design, Dial Plan, #9562230403, Chapter 8, pp. 1-70, May 2004.

Lucent Technologies Merlin Legend Communications System, Release 6.1, Network Reference, 555-661-150 Comcode 108289703; Issue 1, Aug. 1998; 369 pages.

Examiner's Office Letter (including transaltion) for Japanese Patent Application No. 2005-377382, mailed Mar. 11, 2009.

* cited by examiner

IN-BAND CALL ASSOCIATION SIGNALING FOR A SINGLE NUMBER DESTINATION

CROSS REFERENCE TO RELATED APPLICATION

This application claims the benefits under 35 U.S.C. § 119 of U.S. Provisional Patent Application Ser. No. 60/641,629, filed Jan. 4, 2005, of the same title and to the same inventors, which is incorporated herein by this reference.

Cross reference is made to U.S. patent application Ser. No. 11/107,524, filed concurrently herewith, and entitled "ALTERNATE ROUTING OF MEDIA CONNECTIONS WITHIN A SINGLE COMMUNICATIONS SYSTEM ACROSS PUBLIC OR PRIVATE NETWORK FACILITIES", which is incorporated herein by this reference.

FIELD

The invention relates generally to converged communications networks and particularly to alternate communication paths for voice communications.

BACKGROUND

IP networks generally provide an excellent infrastructure for geographically distributing components of a telecommunication system. The underlying IP network is optimal for transmission for control signaling, and, when bandwidth is available, can provide an acceptable Quality of Service (or QoS) or Grade of Service (or GOS) for voice communications. When insufficient network resources are available for voice communications or one or more IP network components are down, voice communications can be adversely impacted.

A number of techniques have been attempted to address these issues.

In one technique, if a system had multiple communication gateways controlled by a single controller and the private switching facilities inter-connecting these gateways failed, users can "dial-out" on a public network trunk using the public address (or Direct Inward Dialing or DID number) of the destination party. This approach requires manual intervention by the user first to recognize that a problem exists, second to determine how to circumvent it, and third to dial the DID number. Normally, the calling party would dial only an extension to reach the destination party. If the destination party to be reached does not have a public number, he or she is not reachable by the alternate network.

Figure 1:
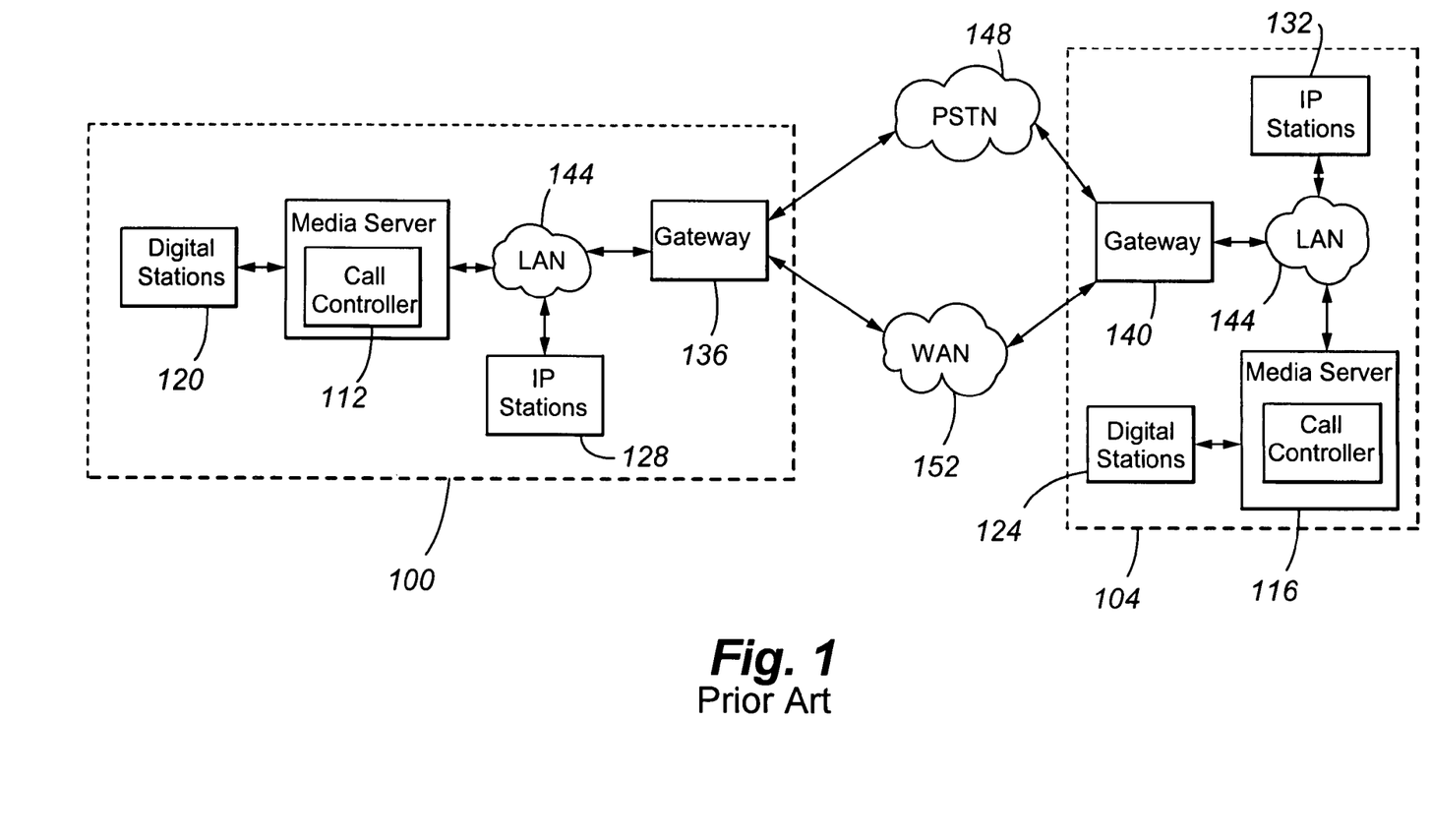
FIG. 1 is a prior art call control architecture.

In another technique known as PSTN Fallback™ of Avaya Inc., a call is forced to the PSTN when an IP trunk connection experiences an unacceptable QoS or GOS. With reference to FIG. 1, a multi-enterprise architecture is depicted, each enterprise 100 and 104 having a separate, independent, and active or primary media servers 112 and 116 with resident call controller functionality. Each enterprise also includes a plurality of digital stations 120 and 124, a plurality of IP or Internet Protocol stations 128 and 132, a gateway 136 and 140 and a Local Area Network or LAN 144 and 148. The media servers 112 and 116 are independent in that one media server in one enterprise is generally unaware of the subscriber configuration information, such as extensions, of the other enterprise's subscribers. The gateways 136 and 140 are interconnected by the Public Switched Telephone Network or PSTN 148 and Wide Area Network or WAN 152. When a call is to be placed over the WAN 152, the originating call controller determines the currently measured network delay and packet loss. When either measured variable reaches a predetermined threshold, the call controller automatically takes the idle IP trunk ports out-of-service, i.e., it busies out the ports. The ports remain out-of-service until the measurements return to the low threshold. No new calls are allowed over the IP trunk. Normal or conventional call routing over the PSTN 148 is used for access to the next preference in the rout pattern.

In another technique known as Separation of Bearer and Signaling™ (SBS) of Avaya Inc., the signaling channel for a call is routed over the WAN 152 while the bearer channel is routed over the PSTN 148. The signaling channel in SBS includes SBS call-control signaling and QSIG private-networking protocol information. SBS associates the signaling and bearer channels at the SBS originating and terminating nodes so that they appear to the end users to be a normal, non-separated call. The use of the WAN for signaling traffic and the PSTN for voice bearer traffic addresses a customer need for using small amounts of bandwidth in the IP WAN for signaling traffic, with the voice bearer portion of the call being sent over inexpensive PSTN facilities. Like PSTN Fallback, SBS™ is used in multi-enterprise calls with each enterprise having separate, independent, and active media servers.

PSTN Fallback™ and SBS™ address architectures where there exist multiple, separate system implementations interconnected by a traditional inter-switch trunking protocol; in other words, they permit inter-connection only of peer-to-peer systems. With the move to larger, single-server IP WAN-connected media gateway distributed systems, there is no longer a need for IP trunks and SBS. Using trunk group administration to limit bandwidth between media servers is not required nor is PSTN Fallback™ when the number of calls exceeds the administered IP trunk member limit. There is no need to embed an intelligent signaling interface between servers over IP WAN facilities given that the system has only a single active or primary server and that all calls across the system appear to be station-to-station calls.

Another technique for managing IP bandwidth usage includes call admission control in which the number of calls across the WAN or the bandwidth available for voice calls is limited. Call admission control can result in the call being denied and being forwarded to the callee's voice mail server (if accessible), thereby causing caller frustration.

There is a need, particularly in a single-server system, for a call control system that manages IP bandwidth usage effectively, particularly during high traffic periods and/or provides an alternate communication path in the event of problems with the WAN.

SUMMARY

These and other needs are addressed by the various embodiments and configurations of the present invention. The present invention is directed generally to the establishment of public or private network (that are normally not owned or managed by the enterprise communications controller) inter-gateway connections, particularly via trunks, for a community of users/subscribers using a generic or common address for the community. As used herein, "gateway" refers not only to gateways but also to devices providing similar functionality, such as port networks.

In one embodiment, the present invention is directed to a telecommunications method including the steps of:

(a) providing geographically dislocated first and second network regions of an enterprise network, the first and second network regions being in communication with one another through first and second networks and respectively including first and second gateways and first and second groupings of trunks connected to the first network, with a common electronic address (e.g., telephone number) being associated with the second grouping of trunks;

(b) the first network region receiving, from a first subscriber and as part of a request to establish a real-time or near real-time communication session, a first electronic address identifying a second subscriber in the second network region;

(c) the first network region transmitting the common electronic address to the second network region in an outgoing communication; and (d) after the outgoing communication is answered by the second network region, transmitting over a bearer path for the session to the second network region an identifier. The identifier is commonly unique relative to other identifiers transmitted by the call controller during a selected period of time. By way of example, the identifier may be a user identifier that is associated with the second subscriber and/or an unrelated phantom user, a service record identifier, a port identifier, a random or pseudorandom number, and the like. The identifier is used to direct the communication to the second subscriber. The "communication" may be any real-time or near real-time communication, such as a wireline or wireless live voice call, an instant messaging session, a Short Message Service or SMS session, chat session, and the like.

The first and second networks may be connection-oriented or connectionless and wireline or wireless. The first and second networks are commonly discrete from and independent of one another in that they employ different protocols and/or switching mechanisms for the same type of communication, e.g., for live voice communications. In one preferred configuration, the first network is circuit-switched and the second network is packet-switched.

In the embodiment, communities of users can be connected using a number of electronic addresses that is less than the numbers of members in each community. For example given two communities of users A1-An and B1-Bn, a connection can be made from any user Ai to any user Bj using the PSTN and a common telephone number. The connection typically requires no action or assistance from Ai or Bj and removes the need for the trunk call to access an attendant, either manual or automated.

For example in an enterprise network having locations or network regions X and Y managed, via gateways, by a single or common communications controller, a common pre-determined public address (e.g., a DID number) is assigned to a plurality of incoming bearer connections or trunks on side B. Any member Bj of the community of users B1-Bn does not require a unique public address. The fact that a call arrives at the public address identifies the incoming trunk as an inter-gateway connection. The incoming call is automatically answered and, via in-band signaling, the outgoing and incoming trunks exchange a unique set of digits which allows the common call controller to associate the outgoing and incoming trunks as two ends of a complete end-to-end connection. The in-band digits exchanged do not directly identify user A or B. Rather, they are used to identify outgoing trunk Tx to incoming trunk Ty. Once Tx and Ty have been paired, the trunk connection can be used for any call currently being established between locations X and Y. Thus, there can be multiple bearer connections being established simultaneously, but they terminate to the same B side address. Having one public address can remove the need for each entity on the destination gateways to have a respective unique public address. This configuration also removes the burden from the originating user of manually dialing a different address when the primary connection network is unavailable.

These and other advantages will be apparent from the disclosure of the invention(s) contained herein.

As used herein, "at least one . . . and", "at least one . . . or", "one or more of . . . and", "one or more of . . . or", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, and A, B and C together.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 2:
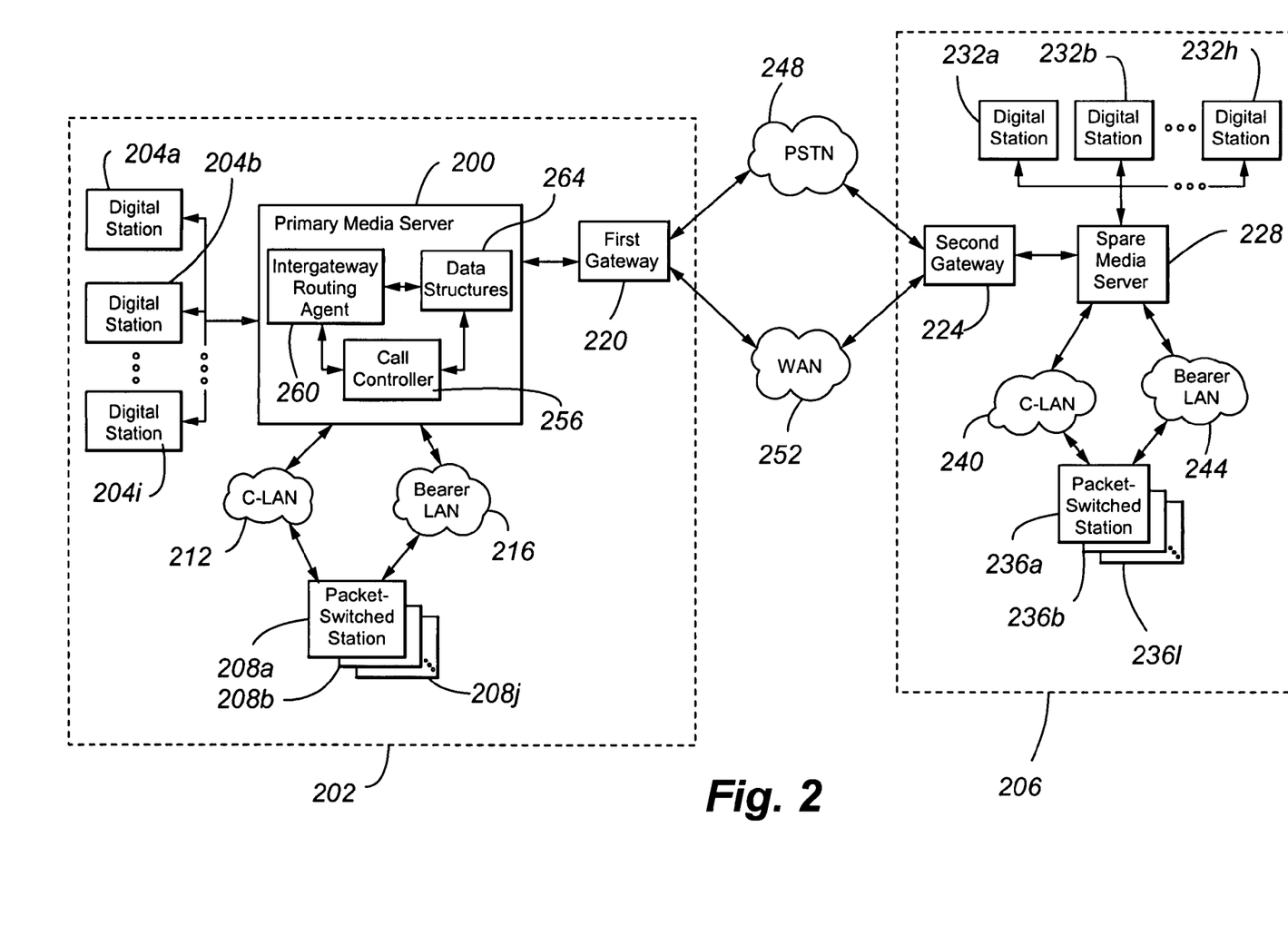
FIG. 2 is a block diagram according to an embodiment of the present invention.

FIG. 2 depicts an architecture according to an embodiment of the present invention. The architecture is in a single enterprise network having geographically dislocated first and second regions 202 and 206. The first region 202 includes a primary or active media server 200 connected to a plurality of subscriber digital stations 204a-i and a plurality of subscriber IP stations 208a-j via Control LAN or C-LAN 212 and bearer LAN 216, and first gateway 220. The second region 206 includes a spare or secondary media server 228 connected to a plurality of subscriber digital stations 232a-k and a plurality of subscriber packet-switched stations 236a-1 via C-LAN 240 and bearer LAN 244 and a second gateway 224. The first and second gateways 220 and 224 are interconnected via the PSTN 248 and a WAN 252.

Each of the subscriber digital stations and packet-switched stations can be one or more wireline or wireless packet-switched and/or circuit-switched communication devices, respectively. For example, the digital stations can be digital telephones such as Digital Communications Protocol or DCP phones, voice messaging and response units, traditional computer telephony adjuncts, and wired and wireless circuit-switched telephones, and the packet-switched stations can be Avaya Inc.'s, 4600 Series IP Phones™, IP softphones such as Avaya Inc.'s, IP Softphone™, Personal Digital Assistants or PDAs, Personal Computers or PCs, laptops, and H.320 video phones and conferencing units.

Each of the first and second gateways is an electronic signal repeater and protocol converter that commonly provides a telephone exchange service, supporting the connection of the various types of stations and outside packet-switched and/or circuit-switched telephone lines (such as analog trunks, ISDN lines, E1/T1 voice trunks, and WAN routing IP trunks). Telephone lines are typically connected to the gateway via ports and media modules on the chassis, with different media modules providing access ports for different types of stations and lines. Voice and signaling data between packet-switched and circuit-switched protocols is normally effected by the media modules converting the voice path to a TDM bus inside the gateway. An engine, such as a Voice Over IP or VoIP engine, converts the voice path from the TDM bus to a compressed or uncompressed and packetized VoIP, typically on an Ethernet connection. Each gateway commonly includes a number of port and trunk circuit packs for performing selected telecommunications functions, such as (DTMF) tone detection, tone generation, playing audio (music and/or voice) announcements, traffic shaping, call admission control, and a media processor, and one or more IP server interfaces. Examples of gateways include Avaya Inc.'s SCC1™, MCC1™, CMC™, G350™, G600™, G650™, and G700™.

The C-LANs 212 and 240, bearer LANs 216 and 244, and WAN 252 are packet-switched and may employ any suitable protocol, such as the TCP/IP suite of protocols, the Ethernet protocol, the Session Initiation Protocol or SIP, and/or the H.323 protocol.

The primary and spare media servers controlling the gateways can be any converged architecture for directing circuit-switched and/or packet-switched customer contacts to one or more stations. As will be appreciated, the primary media server normally controls the first and second gateways. In the event of a loss of communication with the second gateway, such as through a catastrophic WAN failure, the spare media server becomes active and takes over control of the second gateway 224. A loss of control or connectivity is typically determined by a heartbeat or polling mechanism. Commonly, the media servers are stored-program-controlled systems that conventionally include interfaces to external communication links, a communications switching fabric, service circuits (e.g., tone detectors and generators, announcement circuits, etc.), memory for storing control programs and data, and a processor (i.e., a computer) for executing the stored control programs to control the interfaces and the fabric and to provide automatic contact-distribution functionality. Illustratively, the media servers can be a modified form of the subscriber-premises equipment disclosed in U.S. Pat. Nos. 6,192,122; 6,173,053; 6,163,607; 5,982,873; 5,905,793; 5,828,747; and 5,206,903, all of which are incorporated herein by this reference; Avaya Inc.'s Definity™ Private-Branch Exchange (PBX)-based ACD system; Avaya Inc.'s IP600™ LAN-based ACD system, or an S810™, S8300™, S8500™, S8700™, or S8710™ media server running a modified version of Avaya Inc.'s Communication Manager™ voice-application software with call processing capabilities and contact center functions. Other types of known switches and servers are well known in the art and therefore not described in detail herein.

Each of the primary and spare media servers 200 and 228 include call controller functionality 256, an inter-gateway routing agent 260, and call-related data structures 264. Call controller 256 performs call control operations, such as call admission control, progressive call control, and originating call control, and the inter-gateway routing agent alternately routes calls (referred to as (Inter-Gateway Alternate Route or IGAR calls) over circuit-switched trunks (e.g., public or private ISDN PRI/BRI trunks and R2MFC trunks) in the PSTN 248 when the WAN 252 is determined to be incapable of carrying the bearer connection. The WAN may be determined to be incapable of carrying the bearer connection when one or more of the following is true: a desired QoS and/or GOS for a communication is not currently available using the WAN, the communication may not be effected using the WAN, a system configuration precludes or impedes the use of the WAN for selected type of communication, a would-be contactor does not desire to use the WAN for the communication, and the like. The WAN 252 is typically determined to be incapable when the number of calls or bandwidth (e.g., Kbits/sec or Mbits/sec on a packet-switched station, trunk, and/or media gateway and/or an explicit number of connections) allocated via call admission control (or bandwidth limits) has been reached, Voice over IP or VoIP resource (e.g., RTP resource) exhaustion in the first and/or second gateway occurs, a codec set between a network region pair is not specified, forced redirection between a pair of network regions is in effect, and/or when control of the second gateway 224 is lost by the primary media server (e.g., when the packet-switched WAN 252 has a catastrophic failure thereby resulting in partitioning of the network with each region 202 and 206 having an active media server). The agent can preserve the internal makeup of the IGAR call between a pair of gateways in separate port network regions even though the voice bearer portion of the IGAR call is rerouted over alternative PSTN facilities. In this manner, the agent 260 can provide desired levels of QoS and/or GOS to large distributed single-server telecommunications networks having numerous branch offices and distributed call centers.

As will be appreciated, an IGAR call may be routed over the PSTN for reasons other than a call between subscribers. For example, a station in one network region can bridge onto a call appearance of a station in another network region, an incoming trunk in one network region is routed to a hunt group with agents in another network region, and an announcement or music source from one network region must be played to a party in another network region.

In one configuration, each network region is assigned one or more unique DID numbers (also referred to as an IGAR Listed Directory Number of LDN) that is dialed during set up of the call over the PSTN facilities. The IGAR LDN is a group-type number that is able to answer multiple calls and assign each call to a phantom IGAR user (that is commonly unrelated to the caller and callee). The LDN acts as a single DID number that may be dialed to reach any member of a set of subscribers located in a selected network region. This configuration in essence provides "virtual receptionist" or auto attendant that can direct a call without requiring the caller to dial a discrete DID number for each user. Typically, Automatic Route Selection or ARS or Automatic Alternate Routing or AAR is used to route a trunk (IGAR) call from one network region to the LDN extension administered for the other network region. In this manner, the gateway receiving an incoming IGAR call can determine, from the collected digits, that the call is directed to the LDN extension corresponding to the host network region.

In one configuration, when an IGAR call or feature invocation is terminated the agent 260 caches the IGAR trunk connection for a specified time period and/or until a predetermined event ends (such as service being restored in the WAN or bandwidth and/or VoIP resources becoming available). Caching provides an available in the event that the connection is needed for a later call between the same or different subscribers. Setting up a trunk inter-gateway connection is costly in terms of user-perceived call setup time, typically requiring at least several seconds to complete. Caching can provide a new trunk inter-gateway connection immediately, thereby eliminating the observable delays as perceived by the caller. When the time period expires and/or the specified event ends, the cached trunk inter-gateway connection may be dropped, with the outgoing and incoming trunks again becoming available for normal calls.

A trunk inter-gateway connection is commonly selected from the cache when at least one of the two trunks defining the inter-gateway connection is selected such as by ARS routing as noted above, and the other end of the trunk inter-gateway connection terminates in the desired far-end network region. If a trunk is needed between two network regions and no trunk is currently available due to a network region maximum trunk limit being exceeded and if a trunk inter-gateway between that network region and another network region is available in the cache, the cached trunk inter-gateway connection may be dropped and the newly available outgoing trunk used to set up the trunk inter-gateway connection.

To minimize the impact on users of the length of time required to set up a trunk inter-gateway connection, the called party is commonly not alerted (e.g., no flashing lamps, no display updates, and no ringing) until the trunk call is active (i.e., answered, verified, and cut through). The calling party hears ringback tone immediately and, if the trunk inter-gateway connection takes longer to set up than the administered number of rings for local coverage, the call may proceed to the first coverage point.

In one configuration, there are two types of IGAR calls, namely an IGAR bandwidth management call and an IGAR network fragmentation call. An IGAR bandwidth management call is placed when the number of calls or bandwidth allocated via call admission control (or bandwidth limits) has been reached, Voice over IP or VoIP resource exhaustion in the first and/or second gateway is encountered, a codec set between a network region pair is not specified, and forced redirection between a pair of network regions is in effect. In an IGAR bandwidth management call, the bearer path or channel for the call is routed over the PSTN 248 and the signaling channel over the WAN 252. An IGAR network fragmentation call is placed when the primary media server loses control of the second gateway 224. As will be appreciated, when network fragmentation or partitioning occurs, the second gateway becomes unregistered and the spare media server 228 assumes control of the second gateway 224. Because the WAN is unavailable, both the bearer and signaling channels of the IGAR call are routed over the PSTN 248.

Figure 3A:
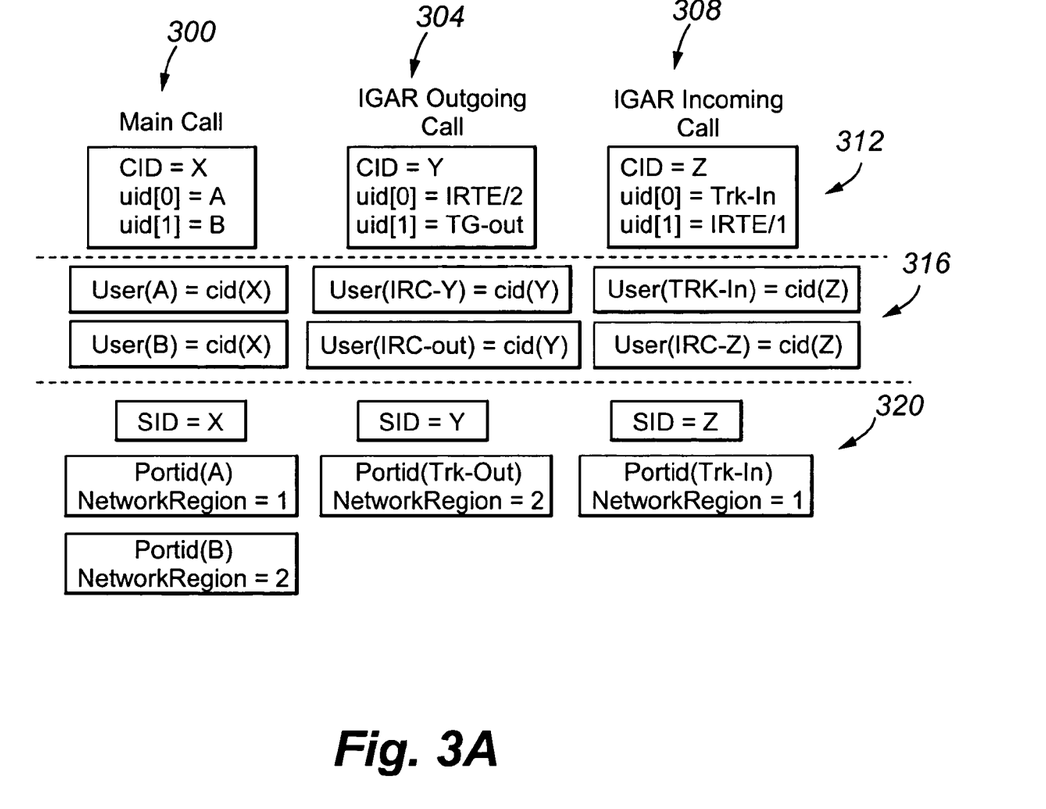
FIG. 3A is a block diagram of the data structures associated with an Inter-gateway Alternate Route or IGAR bandwidth management call.

FIG. 3A depicts the data structures 264 for the various call components in an IGAR bandwidth management call. The call components include the main or original call 300 dialed by the subscriber, the IGAR outgoing call 304 using a phantom IGAR user (that is unrelated to the caller) as the originator, and the IGAR incoming call 308 using a different phantom IGAR user (that is unrelated to the callee) as the destination. In the example of FIG. 3A, "CID" or "cid" refers to call identifier, "uid" to user identifier, "SID" to service identifier, and "Portid" to port identifier. As will be appreciated, the call, user, and service identifiers can be any numerical, alphabetical, or alphanumerical variable or collection of variables that is unique with respect to other identifiers of the same type. With reference to the variables of FIG. 3A, "A" is the call originator in the first network region 202, "B" is the callee in the second network region 206, "X" is the call identifier for the main call (dialed by subscriber A), "Y" is the call identifier for the outgoing IGAR call from the phantom IGAR user "IRTE/2" at the first gateway to the outgoing trunk "TG-out" extending from the first gateway, "Z" is the call identifier for the incoming IGAR call from the phantom IGAR user "IRTE/1" at the second gateway to the incoming trunk "Trk-In" into the first gateway, "Portid(A)" refers to the port identifier corresponding to A's respective station in the first network region, "Portid(B)" refers to the port identifier corresponding to B's respective station in the second network region, "NetworkRegion=1" refers to the first network region, "NetworkRegion=2" refers to the second network region, "Portid(Trk-Out)" is the port identifier corresponding to the outgoing trunk in the first network region, and "Portid (Trk-In)" is the port identifier corresponding to the incoming trunk in the second network region. The upper level 312 depicts the data structures maintained at the call processing layer; the middle level 316 to the data structures maintained at the user layer; and the lower level 320 to the data structures maintained at the connection layer. The main call data structures are completed by the agent 260 after in-band signaling is provided by the first gateway to the second gateway as described below with reference to FIGS. 4 and 5.

Figure 3B:
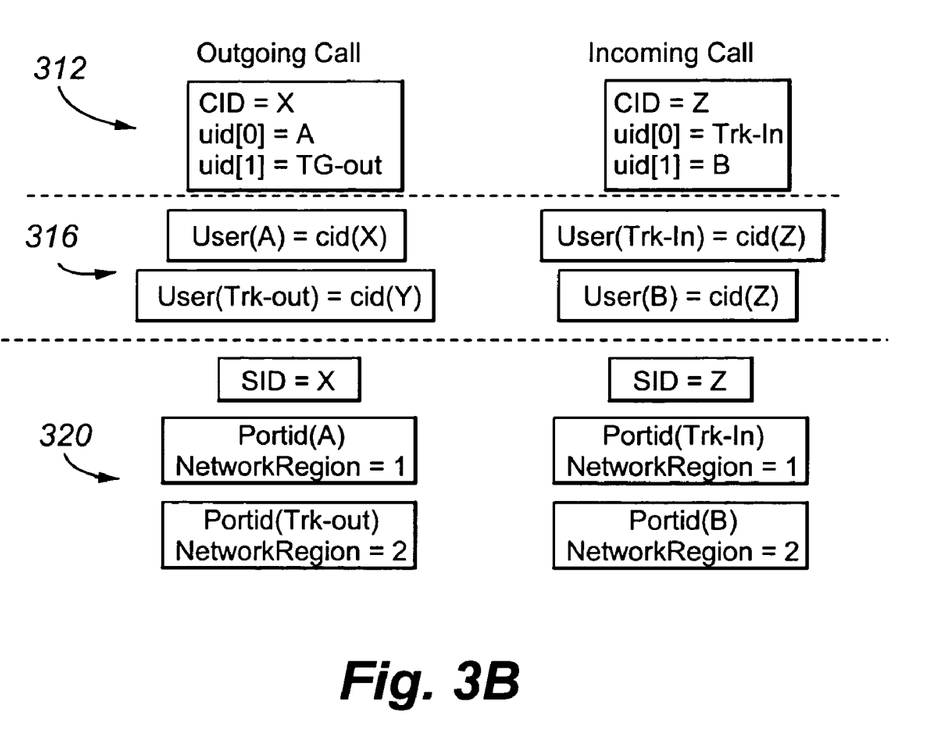
FIG. 3B is a block diagram of the data structures associated with an IGAR network fragmentation call.

FIG. 3B depicts the data structures for the call components in an IGAR network fragmentation call. Unlike the three call components of FIG. 3A, there are only two call components for a network fragmentation call, namely the outgoing and incoming calls. No phantom users are employed in the data structures. Rather, user identifiers for A and B are employed. The acronyms are otherwise the same as those in FIG. 3A.

Figure 4:
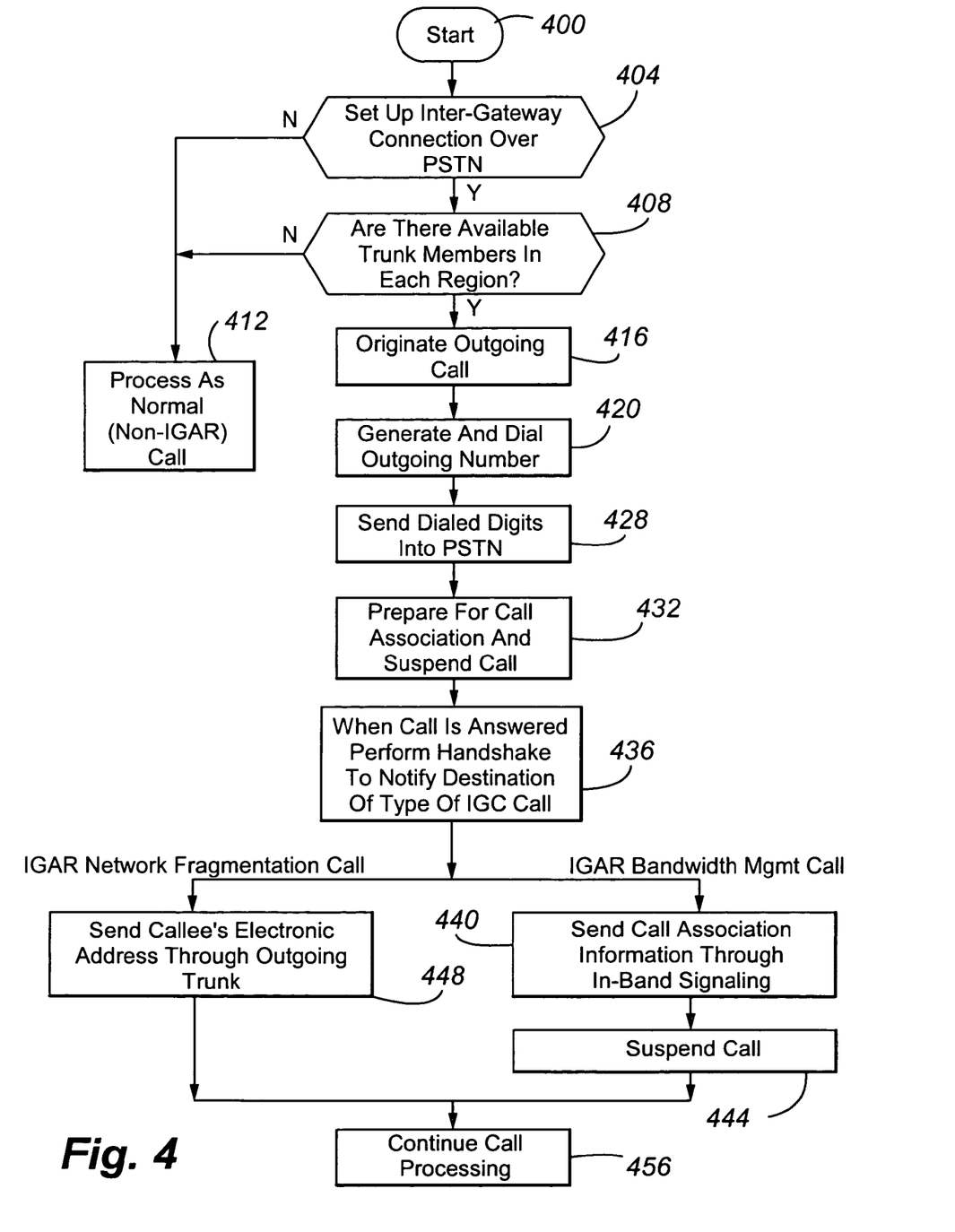
FIG. 4 is a flowchart depicting an operational embodiment of the inter-gateway routing agent.
Figure 5:
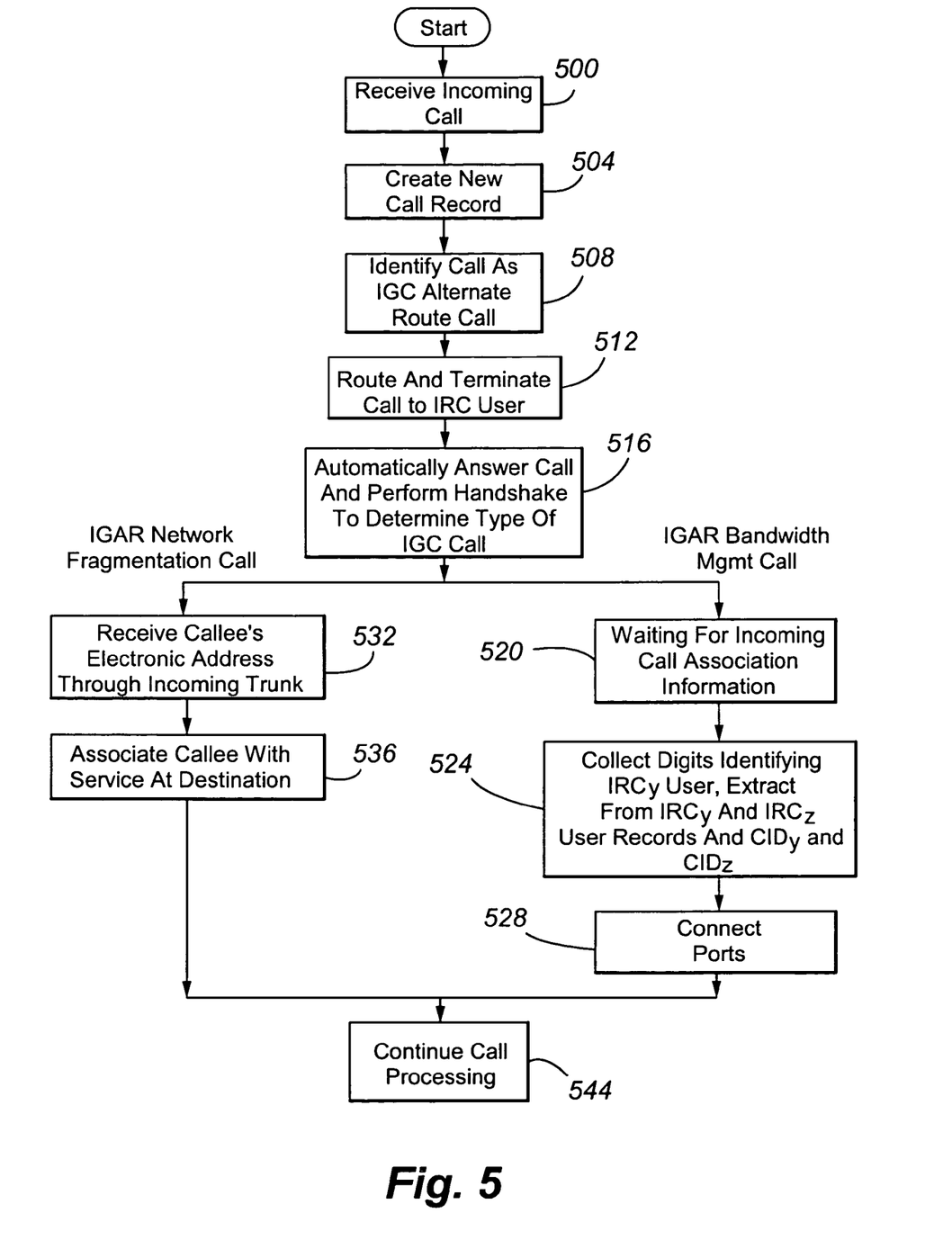
FIG. 5 is a flowchart depicting another operational embodiment of the inter-gateway routing agent.

Turning now to FIGS. 3-5, the operation of the agent 260 will now be described.

In step 400, the call controller 256 receives a new port connect request for an existing service "SID=X" and determines, in decision diamond 404, that an IGAR connection is required to connect the new port (Portid(B)) to the other port (portid(A)) in the service. The controller 256 makes an IGAR request to the agent 260 indicating the identifiers of the two network regions which need to be connected with trunk facilities. The request typically includes an IGAR call identifier, IGAR call-type identifier, the port index and system identifier of port(B), the source gateway identifier (of port B) and destination gateway identifier (or port A). The network, gateway, IGAR, and IGAR call-type identifiers can be any numerical, alphabetical, or alphanumerical variable or collection of variables that is unique with respect to other identifiers of the same type.

In decision diamond 408, the agent 260 determines whether there are available trunk members in each region. If there are insufficient trunk members in each region, the agent 260 rejects the request. In that event or in decision diamond 404 if no inter-gateway connection is required, the call controller 256 proceeds with conventional processing of the call. In the event that there are sufficient trunk members in each region, the agent 260 proceeds to step 416.

In step 416, the agent 260 originates an outgoing call. For an IGAR bandwidth management call, the call is originated by the phantom IGAR user (IRC-Y), and, for an IGAR network fragmentation call, the call is originated by subscriber A. The IGAR user is typically identified by a table index of user IRC=Y. The call controller 256 receives the IGAR call origination and a new call record/call record for the IGAR call is created (i.e., CID=Y and SID=Y) as shown in FIGS. 3A and 3B.

In step 420, the agent 260 constructs and dials a public network number that will route through the PSTN trunking network and terminate at a trunk on the second gateway. The agent first selects and seizes a trunk by making a series of passes through the members of a trunk group. The first pass searches for a member in the originator's gateway. If the first pass is unsuccessful, the second pass looks for members not in the originator's gateway but still in the originator's network region. If the first and second passes are unsuccessful, the third pass selects a trunk from another network region. As will be appreciated, a trunk may be taken from another network region if that network region is still connected and accessible to the originating network region.

In step 428, the dialed digits are sent into the PSTN 248, and the call controller 254 adds the selected trunk "TG-Out" to the service SID=Y for an IGAR bandwidth management call and to the service SID=X for an IGAR network fragmentation call.

The agent 260, in step 432, prepares for IGAR call association and suspends the call. Upon successful trunk termination on CID=Y for for an IGAR bandwidth management call and on CID=X for an IGAR network fragmentation call, the agent 260 requests digit collection resources for the digits to be forwarded by the second gateway in connection with the IGAR call.

In FIG. 5, the second gateway 224 receives the incoming IGAR call in step 500. The second gateway notifies the controlling media server (whether the primary or spare media server) of the incoming call information.

In step 504, the controlling media server performs normal call processing on the incoming call and creates a new call record (CID=Z and SID=Z) for an IGAR bandwidth management call and CID=Z for an IGAR network fragmentation call. Until the digits are analyzed, the controlling media server is not aware that this is an incoming IGAR call. Accordingly, the data structures initially created are those normally created for an incoming call.

In step 508, the incoming IGAR call digits are collected, provided to the controlling media server, and mapped by the controlling media server to the IGAR LDN corresponding to the second network region. The call is now recognized by the controlling media server as an incoming IGAR call.

In step 512, the call is routed and termed by the controlling media server to a selected phantom IGAR user ("IRTE/1"). Because the type of IGAR call is unknown, the data structures of FIG. 3B for the incoming call have a phantom IGAR user substituted for user B.

In step 516, the incoming trunk call is automatically answered. After the trunk is cut-through, a handshake involving bi-directional DTMF transmission occurs to determine the type of IGAR call. For both types of IGAR calls and when the call is answered, the controlling media server instructs the second gateway to repeatedly end-to-end signal a digit or collection of digits to indicate answer back to the first gateway.

The further process for an IGAR bandwidth management call is now discussed with reference to steps 520-528 and 440-444. In step 520, the primary media server suspends call processing on CID=Z when receipt of the digit is acknowledged and waits for the incoming call association information. In step 440, when the digit is recognized by the primary media server, the first gateway end-to-end in-band signals a series of digits back toward the incoming trunk and terminating user. The signals include identifiers for the type of IGAR call and the IRC=Y user. In step 444, the primary media server then suspends call processing on CID=Y. In step 524, the digits are collected identifying the IRC=Y user and passed by the primary media server to the IRC=Y user or agent 260. The agent 260 extracts CID=Y and CID=Z and informs the call controller that CID=Y and CID=Z contain the two inter-region trunk ports that satisfy the IGAR request. In step 528, the call controller, in step 528, finds the two trunk ports, one in each service, and connects port A with trunk Y and port B with trunk Z.

The further process for an IGAR network fragmentation call is now discussed with reference to steps 532-536 and 448-452. The spare media server suspends call processing on CID=Z when receipt of the digit is acknowledged and waits for the incoming call association information. In step 448, when the digit is recognized by the primary media server, the first gateway, in-band signals a series of digits back toward the incoming trunk and terminating user. The series of digits include identifiers for the type of IGAR call and user B. In step 524, the digits are collected identifying user B and normal call processing for a PSTN call thereafter occurs.

In step 544, further call processing is continued on either type of IGAR call using conventional techniques. For example, further call processing can include call coverage and hunting.

A number of variations and modifications of the invention can be used. It would be possible to provide for some features of the invention without providing others.

For example in one alternative embodiment, an LDN is assigned to each circuit-switched trunk connected to a selected network region. Although this configuration would simplify call association, it requires the enterprise to purchase a much larger number of public network numbers, which can be expensive. Additionally, certain resources, such as a music-on-hold and/or announcement resource, do not have a public addressable extension.

In another alternative embodiment, the first media server calls the second media server and then attaches a Touch Tone Receiver, waiting for the second media server to answer. When the second network region answers, the second media server immediately signals the (typically unique) identifier to the first media server. The second media server repeats the transmission a selected number of times in case the digits are lost in prior attempts. The identifier is encoded specially to ensure that the first media server can be confident that it has received a complete and correct identifier. For example, the identifier can be encoded in "octal" and use the digit "9" as a delimiter. In this case, the first media server does not reply but simply begins to use the trunk call as a bearer channel after the unique identifier is verified to be valid.

In yet another embodiment, the present invention is not restricted to a single distributed enterprise network but may be employed by media servers of different enterprises provided appropriate translation information is available at each end of the communication.

In yet another embodiment, the logic described above may be implemented as software, a logic circuit, or a combination thereof.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for effecting a communication between subscribers of an enterprise network, comprising:
   (a) providing geographically dislocated first and second network regions of an enterprise network, the first and second network regions being in communication with one another through first and second networks and respectively comprising first and second gateways and first and second groupings of trunks connected to one of the first and second networks, wherein each of the first and second groupings comprise a plurality of trunks and wherein a common electronic address is associated with the second grouping of trunks;
   (b) the first network region receiving, from a first subscriber, a request to initiate an at least substantially real-time communication session with a second subscriber in the second network region, the request comprising a first electronic address identifying the second subscriber;
   (c) the first network region transmitting the common electronic address to the second network region in an outgoing communication; and
   (d) after the outgoing communication is answered by the second network region, transmitting in band with the outgoing communication to the second network region a unique identifier, wherein the identifier is used to establish the communication session with the second subscriber and wherein the bearer path for the session is over the network used to transmit the outgoing communication and unique identifier, wherein the identifier is a user identifier associated with a phantom user, wherein the common electronic address and first electronic address are each telephone numbers, wherein the substantially real-time communication session is a live voice call, wherein a first phantom user is determined for the first network region and a second phantom user is determined for the second network region, wherein the user identifier transmitted to the second network region is the first phantom user identifier, wherein a first communication-related data structure is associated with the inter-region call, wherein a second communication-related data structure is associated with the outgoing call and the first phantom user, and wherein a third communication-related data structure is associated with an incoming communication from the first network region to the second network region and the second phantom user.

2. The method of claim 1, wherein the first network is packet-switched, wherein the second network is circuit-switched, wherein the common electronic address and first electronic address are each telephone numbers, wherein each of the second grouping of trunks is circuit-switched and connected to the circuit-switched network, and further comprising:
   (c1) the first network region determining that at least one of the following conditions exists: (i) at least one of a predetermined the number of the live voice calls and bandwidth allocated for live voice calls has been and/or will be reached if the bearer channel of the live voice calls is configured over the first network, (ii) resource exhaustion has occurred and/or will occur if the bearer channel of the live voice call is configured over the first network, (iii) a codec set is not specified with respect to transmissions over the first network between the first and second network regions, (iv) forced redirection from the first network to the second network between the first and second network regions is in effect, and (v) a media server in the first or second network region has lost control of the gateway in the other of the first and second network regions.

3. The method of claim 2, wherein condition (i) exists and the user identifier is associated with the phantom user and wherein the user identifier is used to associate an outgoing trunk in the first trunk grouping with an incoming trunk in the second trunk grouping.

4. The method of claim 2, wherein condition (ii) exists and the user identifier is associated with the phantom user and wherein the user identifier is used to associate an outgoing trunk in the first trunk grouping with an incoming trunk in the second trunk grouping.

5. The method of claim 2, wherein condition (iii) exists and the user identifier is associated with the phantom user and wherein the user identifier is used to associate an outgoing trunk in the first trunk grouping with an incoming trunk in the second trunk grouping.

6. The method of claim 2, wherein condition (iv) exists and the user identifier is associated with the phantom user and wherein the user identifier is used to associate an outgoing trunk in the first trunk grouping with an incoming trunk in the second trunk grouping.

7. The method of claim 2, wherein condition (v) exists and the user identifier is associated with the second user.

8. The method of claim 1, wherein step (d) comprises the substeps:
   (d1) collecting digits corresponding to the user identifier;
   (d2) associating the second and third data structures;
   (d3) based on the associating step, determining a first port identifier associated with the outgoing communication and a second port identifier associated with the incoming communication; and
   (d4) connecting the ports associated with the first and second port identifiers.

9. The method of claim 1, wherein the identifier is a user identifier associated with at least one of the second user and a phantom user and wherein step (d) comprises the substeps:
   (d1) transmitting in band a communication-type identifier indicating whether the communication is a network fragmentation-type call or a bandwidth management-type call, wherein, when the communication-type identifier indicates a network fragmentation-type call, the user identifier is associated with the second user and, when the communication-type identifier indicates a bandwidth management-type call, the user identifier is associated with the phantom user.

10. The method of claim 1, wherein the first network region comprises a first plurality of subscribers and the second network region comprises a different second plurality of subscribers and further comprising:

(e) establishing a plurality of simultaneous bearer connections between members of the first and second pluralities of subscribers, wherein the plurality of bearer connections terminate to the common electronic address.

11. The method of claim 1, further comprising, after termination of the communication session between the first and second subscribers:

caching a trunk connection between the first and second gateways, the trunk connection having been used during the communication session.

12. A computer readable medium comprising processor executable instructions that, when executed, perform the steps of claim 1.

13. A logic circuit operable to perform the steps of claim 1.

14. An enterprise network, comprising:

geographically dislocated first and second network regions of an enterprise network, the first and second network regions being in communication with one another through connectionless and connection-oriented networks and respectively comprising:

first and second gateways; and first and second groupings of trunks connected to one of the connectionless and connection-oriented networks, wherein a common electronic address is associated with the second grouping of trunks and wherein each of the first and second trunk groupings comprise a plurality of trunks;

a first media server positioned in the first network region, the first media server comprising:

a call controller operable to receive, from a first subscriber and as part of a request to establish an at least substantially real-time communication session, a first electronic address identifying a second subscriber in the second network region; and an inter-gateway routing agent operable to effect transmission of the common electronic address to the second gateway over a bearer path for the session and, after the common electronic address is received by the second gateway, transmit over the bearer path to the second gateway a unique identifier, wherein the user identifier is used to establish the communication session with the second subscriber, wherein the identifier is a user identifier associated with a phantom user, wherein the connectionless network is packet-switched and the connection-oriented network is circuit-switched, wherein the common and first electronic addresses are each telephone numbers, wherein the substantially real-time communication session is a live voice call, wherein a first phantom user is determined for the first network region and a second phantom user is determined for the second network region, wherein the user identifier transmitted to the second network region is the first phantom user identifier, wherein a first communication-related data structure is associated with the first inter-region call, wherein a second communication-related data structure is associated with an outgoing call containing the common electronic address and the first phantom user, and wherein a third communication-related data structure is associated with an incoming communication from the first network region to the second network region and the second phantom user.

15. The network of claim 14, wherein the connectionless network is packet-switched and the connection-oriented network is circuit-switched, wherein the common and first electronic addresses are each telephone numbers, wherein each of the second grouping of trunks is circuit-switched and is connected to the circuit-switched network and wherein the call controller is operable determine that at least one of the following conditions exists: (i) at least one of a predetermined the number of the live voice calls and bandwidth allocated for live voice calls has been and/or will be reached if the bearer channel of the live voice calls is configured over the first network, (ii) resource exhaustion has occurred and/or will occur if the bearer channel of the live voice call is configured over the first network, (iii) a codec set is not specified with respect to transmissions over the first network between the first and second network regions, (iv) forced redirection from the first network to the second network between the first and second network regions is in effect, and (v) the first media server in the first or second network region has lost control of the gateway in the other of the first and second network regions.

16. The network of claim 15, wherein condition (i) exists and the user identifier is associated with the phantom user and wherein the user identifier is used to associate an outgoing trunk in the first trunk grouping with an incoming trunk in the second trunk grouping.

17. The network of claim 15, wherein condition (ii) exists and the user identifier is associated with the phantom user and wherein the user identifier is used to associate an outgoing trunk in the first trunk grouping with an incoming trunk in the second trunk grouping.

18. The network of claim 15, wherein condition (iii) exists and the user identifier is associated with the phantom user and wherein the user identifier is used to associate an outgoing trunk in the first trunk grouping with an incoming trunk in the second trunk grouping.

19. The network of claim 15, wherein condition (iv) exists and the user identifier is associated with the phantom user and wherein the user identifier is used to associate an outgoing trunk in the first trunk grouping with an incoming trunk in the second trunk grouping.

20. The network of claim 15, wherein condition (v) exists and the user identifier is associated with the second user.

21. The network of claim 14, wherein the routing agent is operable to associate the second data structure with the third data structure, based on the associating step, determine a first port identifier associated with the outgoing communication and a second port identifier associated with the incoming communication, and effect connection of the ports associated with the first and second port identifiers.

22. The network of claim 14, wherein the identifier is a user identifier associated with at least one of the second user and a phantom user, wherein the connectionless network is packet-switched and the connection-oriented network is circuit-switched, wherein the common and first electronic addresses are each telephone numbers, wherein the substantially real-time communication session is a live voice call, wherein the in band transmission comprises a communication-type identifier indicating whether the communication is a network fragmentation-type call or a bandwidth management-type call, wherein, when the communication-type identifier indicates a network fragmentation-type call, the user identifier is associated with the second user and, when the communication-type identifier indicates a bandwidth management-type call, the user identifier is associated with the phantom user.

23. The network of claim 14, wherein the first network region comprises a first set of subscribers and the second network region comprises a different second set of subscribers and wherein the first media server is operable to establish a plurality of simultaneous bearer connections between members of the first and second sets of subscribers and wherein the plurality of bearer connections terminate to the common electronic address.

24. An enterprise network, comprising:
geographically dislocated first and second network regions of an enterprise network, the first and second network regions being in communication with one another through packet-switched and circuit-switched networks and respectively comprising:
first and second gateways means for repeating electronic signals and converting protocols; and
first and second groupings of trunk means for carrying communication signals and being connected to one of the packet-switched and circuit-switched networks, wherein a common telephone number is associated with the second grouping of trunk means, the second grouping of trunk means comprising a plurality of trunks;
media server means, positioned in the first network region, for performing communication processing, the media server means comprising:
call control means for receiving, from a first subscriber and as part of request to initiate a live voice communication with a second subscriber in the second network region, a first telephone number identifying the second subscriber in the second network region; and
inter-gateway routing agent means for transmitting the common telephone number to the second gateway means over a bearer path for the communication and, after the common telephone number is received by the second gateway means, transmitting in band to the second gateway means a unique identifier, wherein the identifier is used to establish the communication with the second subscriber, wherein the identifier is a user identifier associated with a phantom user, wherein a first phantom user is determined for the first network region and a second phantom user is determined for the second network region, wherein the user identifier transmitted to the second network region is the first phantom user identifier, and wherein a first communication-related data structure is associated with the inter-region call, wherein a second communication-related data structure is associated with an outgoing call containing the common telephone number and the first phantom user, and wherein a third communication-related data structure is associated with an incoming call from the second network region to the first network region and the second phantom user.

25. The network of claim 24, wherein each of the second grouping of trunk means is circuit-switched and is connected to the circuit-switched network and wherein the call control means determines that at least one of the following conditions exists: (i) at least one of a predetermined the number of the live voice calls and bandwidth allocated for live voice calls has been and/or will be reached if the bearer channel of the live voice calls is configured over the first network, (ii) resource exhaustion has occurred and/or will occur if the bearer channel of the live voice call is configured over the first network, (iii) a codec set is not specified with respect to transmissions over the first network between the first and second network regions, (iv) forced redirection from the first network to the second network between the first and second network regions is in effect, and (v) the media server means in the first or second network region has lost control of the gateway means in the other of the first and second network regions.

26. The network of claim 25, wherein condition (i) exists and the user identifier is associated with the phantom user and wherein the user identifier is used to associate an outgoing trunk in the first trunk means grouping with an incoming trunk in the second trunk means grouping.

27. The network of claim 25, wherein condition (ii) exists and the user identifier is associated with the phantom user and wherein the user identifier is used to associate an outgoing trunk in the first trunk means grouping with an incoming trunk in the second trunk means grouping.

28. The network of claim 25, wherein condition (iii) exists and the user identifier is associated with the phantom user and wherein the user identifier is used to associate an outgoing trunk in the first trunk means grouping with an incoming trunk in the second trunk means grouping.

29. The network of claim 25, wherein condition (iv) exists and the user identifier is associated with the phantom user and wherein the user identifier is used to associate an outgoing trunk in the first trunk means grouping with an incoming trunk in the second trunk means grouping.

30. The network of claim 25, wherein condition (v) exists and the user identifier is associated with the second user.

31. The network of claim 24, wherein the routing agent means associates the second data structure with the third data structure, based on the associating function, determines a first port identifier associated with the outgoing communication and a second port identifier associated with the incoming communication, and effects connection of the ports associated with the first and second port identifiers.

32. The network of claim 24, wherein the identifier is a user identifier associated with at least one of the second user and a phantom user, wherein the in band transmission comprises a communication-type identifier indicating whether the communication is a network fragmentation-type call or a bandwidth management-type call, wherein, when the communication-type identifier indicates a network fragmentation-type call, the user identifier is associated with the second user and, when the communication-type identifier indicates a bandwidth management-type call, the user identifier is associated with the phantom user.

33. The network of claim 24, wherein the first network region comprises a first set of subscribers and the second network region comprises a different second set of subscribers and wherein the media server means establishes a plurality of simultaneous bearer connections between members of the first and second sets of subscribers and wherein the plurality of bearer connections terminate to the common telephone number.

34. A method, comprising:
(a) providing geographically dislocated first and second network regions of an enterprise network, the first and second network regions being in communication with one another through first and second networks and respectively comprising first and second gateways and first and second groupings of trunks connected to one of the first and second networks, wherein each of the first and second groupings comprise a plurality of trunks and wherein a common electronic address is associated with the second grouping of trunks;
(b) receiving, by the first network region from a first subscriber, a request to initiate an at least substantially real-time communication session with a second subscriber in the second network region, the request comprising a first electronic address identifying the second subscriber;
(c) determining that at least one of the first network is incapable of carrying a bearer connection;

(d) originating a call to the first network region by dialing the common electronic address;

(e) selecting an outgoing trunk port in the first grouping of trunks for the call;

(f) sending signals corresponding to the common electronic address over the selected trunk port;

(g) sending signals corresponding to an identifier of at least one of a phantom user and first subscriber over the selected trunk port;

(h) based on the signals sent in step (g), associating the outgoing trunk port in the first network region with an incoming trunk port in the second network region;

(i) thereafter, receiving a call disconnect signal from at least one of the first and second subscribers;

(j) thereafter, storing information related to the association of the outgoing and incoming trunk ports;

(k) later receiving from a third subscriber in the first network region a request to initiate a call to a fourth subscriber in the second network region;

(l) accessing the stored association information of the outgoing and incoming trunk ports and selecting, for the call from the third subscriber, the outgoing and incoming trunk ports from the stored association information; and (m) originating a call between the third and fourth subscriber over the associated outgoing and incoming trunk ports.

35. The method of claim 34, wherein the first subscriber is different from the third subscriber.

36. The method of claim 35, wherein the second subscriber is different from the fourth subscriber.

37. The method of claim 34, wherein step (c) comprises determining at least one of the following is true: at least one of a desired QoS and GOS for a communication is not currently available using the first network, the communication may not be effected using the first network, a system configuration at least one of precludes and impedes the use of the first network for a selected type of communication, at least one of the first and second subscriber does not desire to use the first network for the communication, the number of calls or bandwidth allocated via call admission control has been reached, Voice over IP or VoIP resource exhaustion in at least one of the first and second gateway has occurred, a codec set between a network region pair is not specified, forced redirection between a pair of network regions is in effect, control of the second gateway is lost by a primary media server in the first network region.

38. The method of claim 34, wherein the first network is packet-switched, wherein the second network is circuit-switched, wherein the common electronic address and first electronic address are each telephone numbers, wherein each of the second grouping of trunks is circuit-switched and connected to the circuit-switched network.

39. An enterprise network, comprising:

geographically dislocated first and second network regions of an enterprise network, the first and second network regions being in communication with one another through connectionless and connection-oriented networks and respectively comprising:

first and second gateways; and first and second groupings of trunks connected to one of the connectionless and connection-oriented networks, wherein a common electronic address is associated with the second grouping of trunks and wherein each of the first and second trunk groupings comprise a plurality of trunks;

a first media server positioned in the first network region, the first media server comprising:

a call controller operable to receive, from a first subscriber and as part of a request to establish an at least substantially real-time communication session, a first electronic address identifying a second subscriber in the second network region; and an inter-gateway routing agent operable to effect transmission of the common electronic address to the second gateway and then select an outgoing trunk port in the first grouping of trunks for the call, send signals corresponding to the common electronic address and an identifier of at least one of a phantom user and first subscriber over the selected trunk port, create an association between the outgoing trunk port in the first network region and an incoming trunk port in the second network region, and then after the association has been created, receive a call disconnect signal from at least one of the first and second subscribers, storing association information for the outgoing and incoming trunk ports after the call disconnect signal has been received such that the outgoing and incoming trunk ports are not available for normal calls, later, receive from a third subscriber in the first network region a request to initiate a call to a fourth subscriber in the second network region, access the stored association information and select the associated outgoing and incoming trunk ports for the call from the third subscriber, and originate a call between the third and fourth subscriber over the associated outgoing and incoming trunk ports.

40. The network of claim 39, wherein the first subscriber is different from the third subscriber.

41. The network of claim 40, wherein the second subscriber is different from the fourth subscriber.

42. The network of claim 39, wherein step (c) comprises determining at least one of the following is true: at least one of a desired QoS and GOS for a communication is not currently available using the first network, the communication may not be effected using the first network, a system configuration at least one of precludes and impedes the use of the first network for a selected type of communication, at least one of the first and second subscriber does not desire to use the first network for the communication, the number of calls or bandwidth allocated via call admission control has been reached, Voice over IP or VoIP resource exhaustion in at least one of the first and second gateway has occurred, a codec set between a network region pair is not specified, forced redirection between a pair of network regions is in effect, control of the second gateway is lost by a primary media server in the first network region.

43. The network of claim 39, wherein the connectionless network is packet-switched and the connection-oriented network is circuit-switched, wherein the common and first electronic addresses are each telephone numbers, wherein each of the second grouping of trunks is circuit-switched and is connected to the circuit-switched network.

* * * * *